(12) United States Patent
Kobayashi et al.

(10) Patent No.: US 11,131,380 B2
(45) Date of Patent: Sep. 28, 2021

(54) POSITION CONTROLLER

(71) Applicant: KAWASAKI JUKOGYO KABUSHIKI KAISHA, Kobe (JP)

(72) Inventors: Shuma Kobayashi, Kobe (JP); Kippei Matsuda, Kobe (JP); Satoshi Ootsuki, Akashi (JP); Kenichi Nakashima, Kobe (JP); Hideyuki Imai, Akashi (JP); Akihito Abe, Kakogawa (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 2 days.

(21) Appl. No.: 16/617,594

(22) PCT Filed: May 16, 2018

(86) PCT No.: PCT/JP2018/018953
§ 371 (c)(1),
(2) Date: Nov. 27, 2019

(87) PCT Pub. No.: WO2018/221226
PCT Pub. Date: Dec. 6, 2018

(65) Prior Publication Data
US 2020/0182351 A1    Jun. 11, 2020

(30) Foreign Application Priority Data
May 31, 2017    (JP) .............................. JP2017-108177

(51) Int. Cl.
*F16H 61/664*    (2006.01)
*F16H 61/02*    (2006.01)
(Continued)

(52) U.S. Cl.
CPC ....... *F16H 61/0265* (2013.01); *F16H 61/664* (2013.01); *G05D 3/20* (2013.01);
(Continued)

(58) Field of Classification Search
CPC ........... Y10T 477/6243; Y10T 477/653; F16H 61/0265; F16H 61/664; F16H 15/38;
(Continued)

(56) References Cited

U.S. PATENT DOCUMENTS 5,984,829 A * 11/1999 Minagawa ............ F16H 61/664
477/98
6,142,908 A    11/2000 Kidokoro et al.
(Continued)

FOREIGN PATENT DOCUMENTS

JP    S64-15508 A    1/1989
JP    2000-39061 A    2/2000
(Continued)

*Primary Examiner* — Roger L Pang
(74) *Attorney, Agent, or Firm* — Sughrue Mion, PLLC

(57) ABSTRACT

A position controller includes: an oil temperature acquisition unit that acquires information on an oil temperature of a hydraulic actuator; a position acquisition unit that acquires an actual value of an operation position of an object; a position control unit that calculates an operation command value for a control valve of the hydraulic actuator by closed-loop control so as to reduce a deviation between a target value of the operation position of the object and the actual value; and a gain setting unit that changes at least one gain of the closed-loop control so that sensitivity of the closed-loop control increases as the oil temperature decreases.

10 Claims, 11 Drawing Sheets

(51) Int. Cl.
*G05D 3/20* (2006.01)
*F16H 15/38* (2006.01)
*B60W 10/109* (2012.01)
*F16H 59/70* (2006.01)

(52) U.S. Cl.
CPC ... *B60W 10/109* (2013.01); *B60W 2510/1005* (2013.01); *B60W 2510/107* (2013.01); *F16H 15/38* (2013.01); *F16H 59/70* (2013.01)

(58) Field of Classification Search
CPC ........... F16H 61/02; F16H 59/72; G05D 3/20; G05D 3/12; B60W 10/109; B60W 2510/107; B60W 2510/1005
USPC ...................................................... 701/60, 61
See application file for complete search history.

(56) References Cited

U.S. PATENT DOCUMENTS

| | | | |
|---|---|---|---|
| 2002/0161503 A1* | 10/2002 | Joe | F16H 61/6648 |
| | | | 701/51 |
| 2019/0032776 A1* | 1/2019 | Nakashima | F16H 61/0213 |
| 2019/0190411 A1* | 6/2019 | Kamio | H02P 27/06 |

FOREIGN PATENT DOCUMENTS

| | | |
|---|---|---|
| JP | 2001-164953 A | 6/2001 |
| JP | 2010-36694 A | 2/2010 |
| JP | 4495117 B2 | 6/2010 |

* cited by examiner

[Fig. 1]
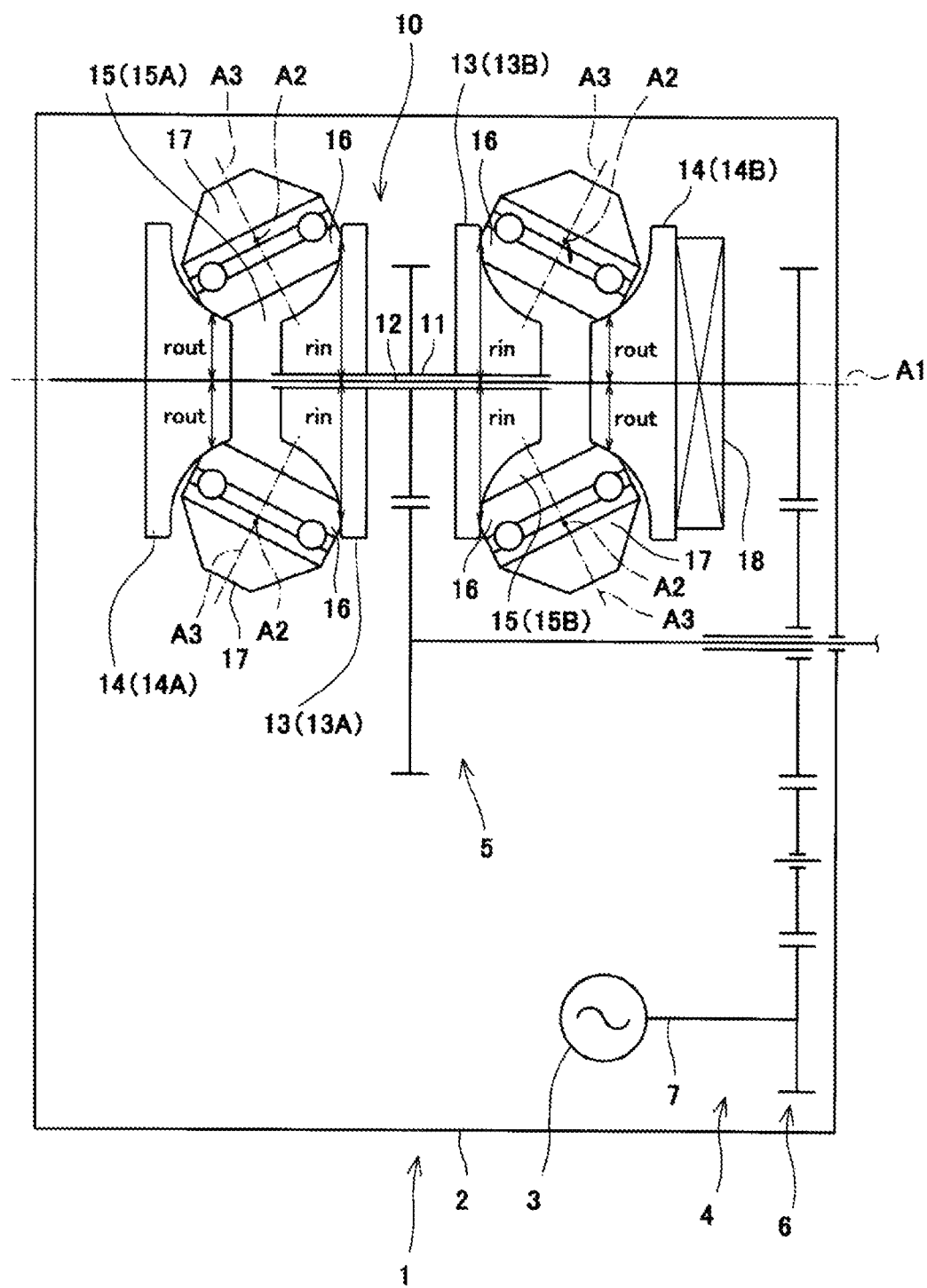

[Fig. 2]
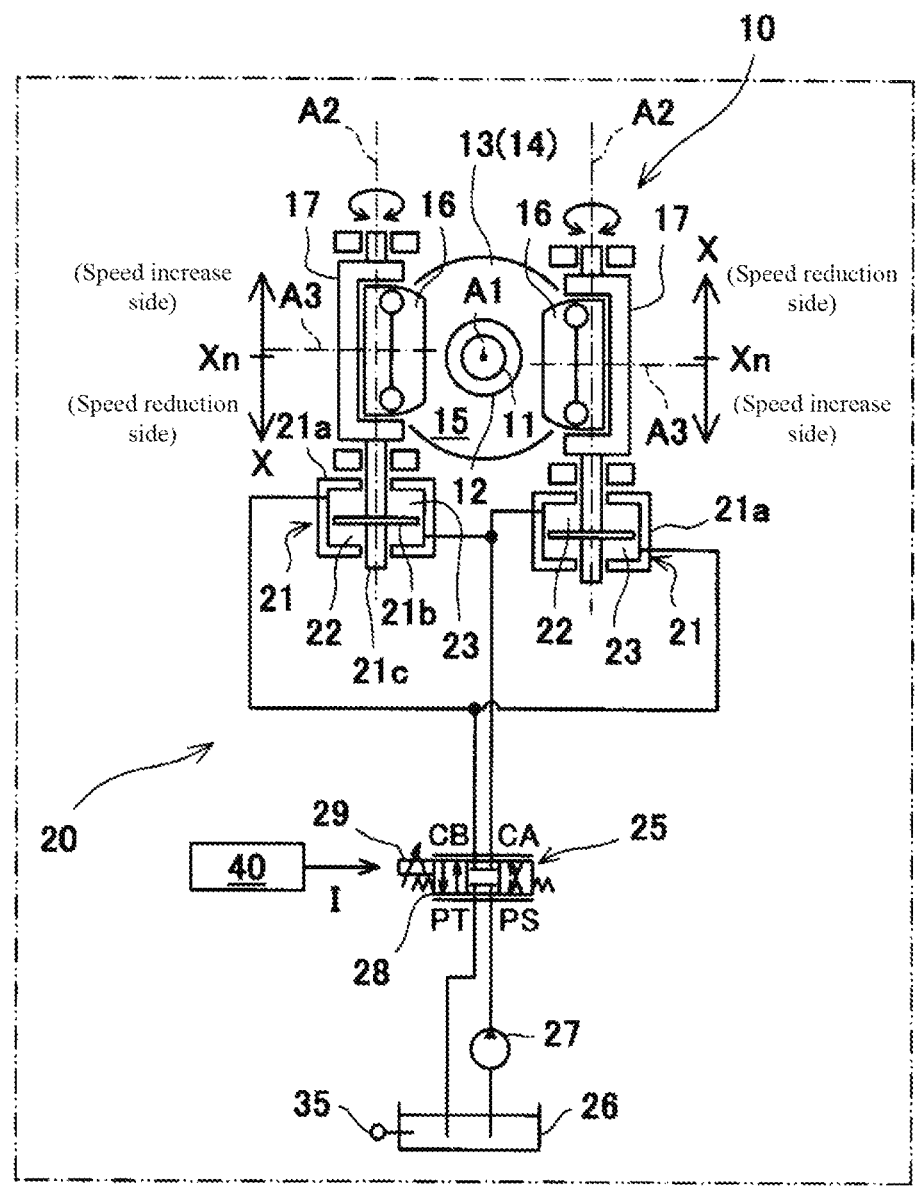

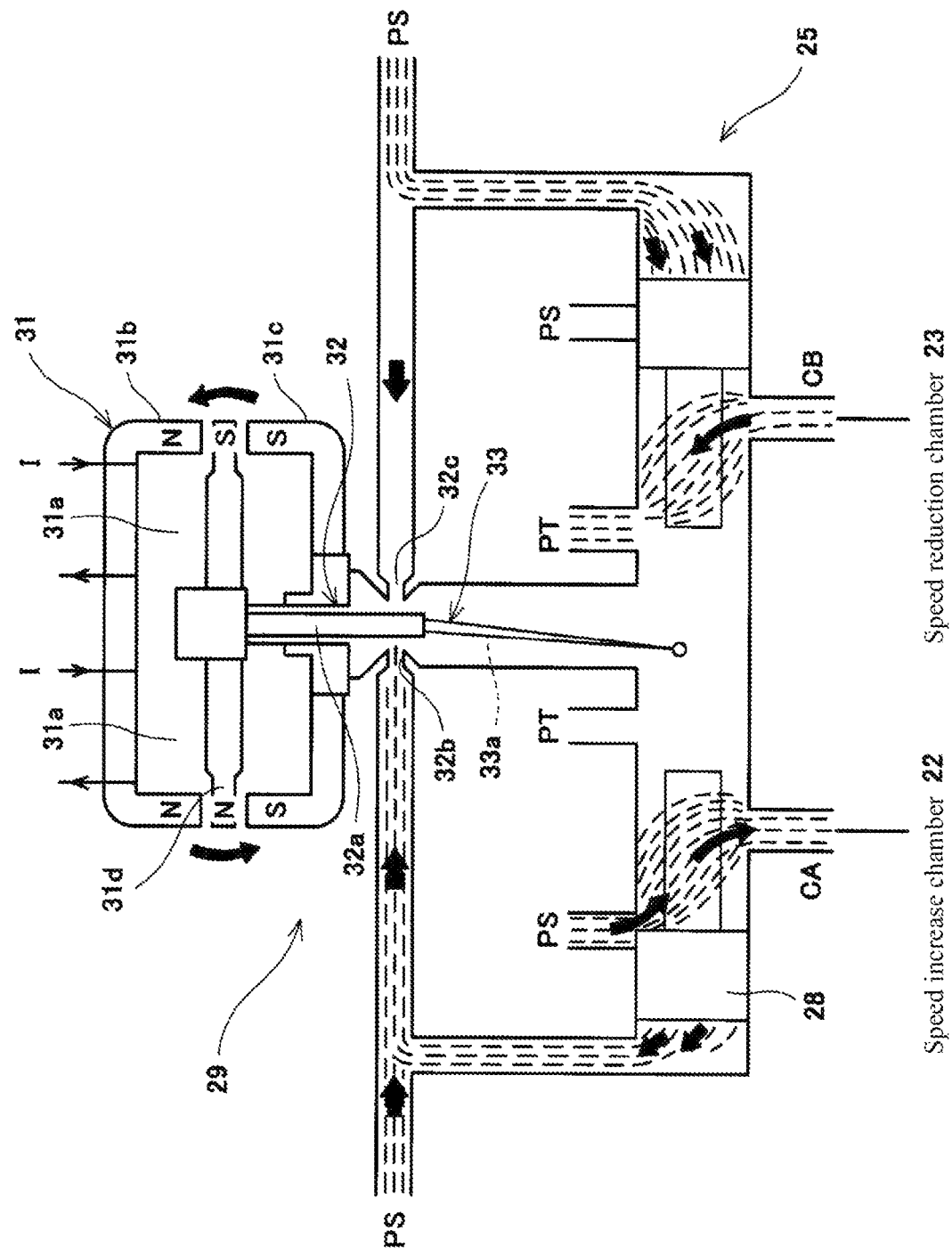
[Fig. 3]

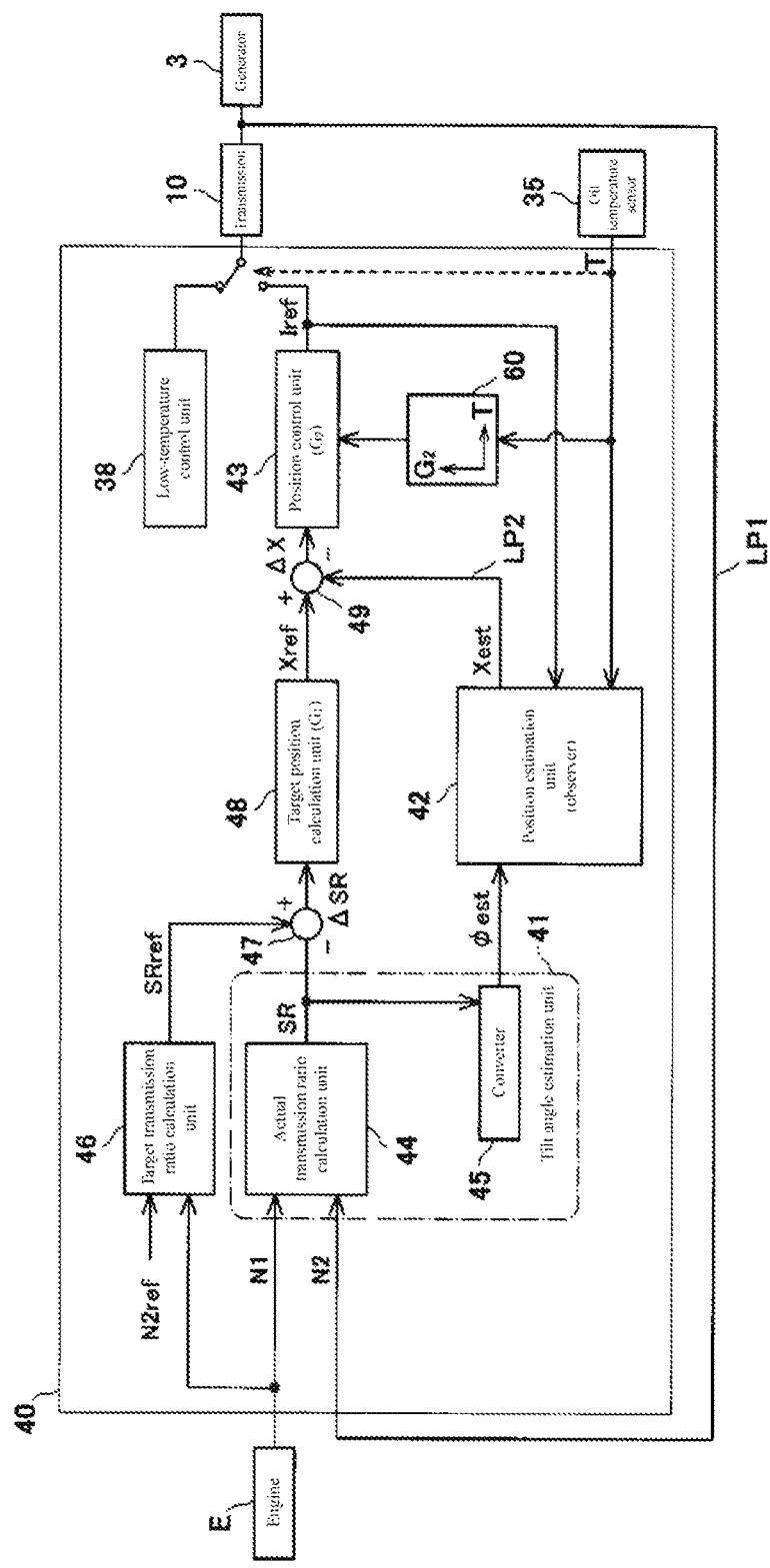
[Fig. 4]

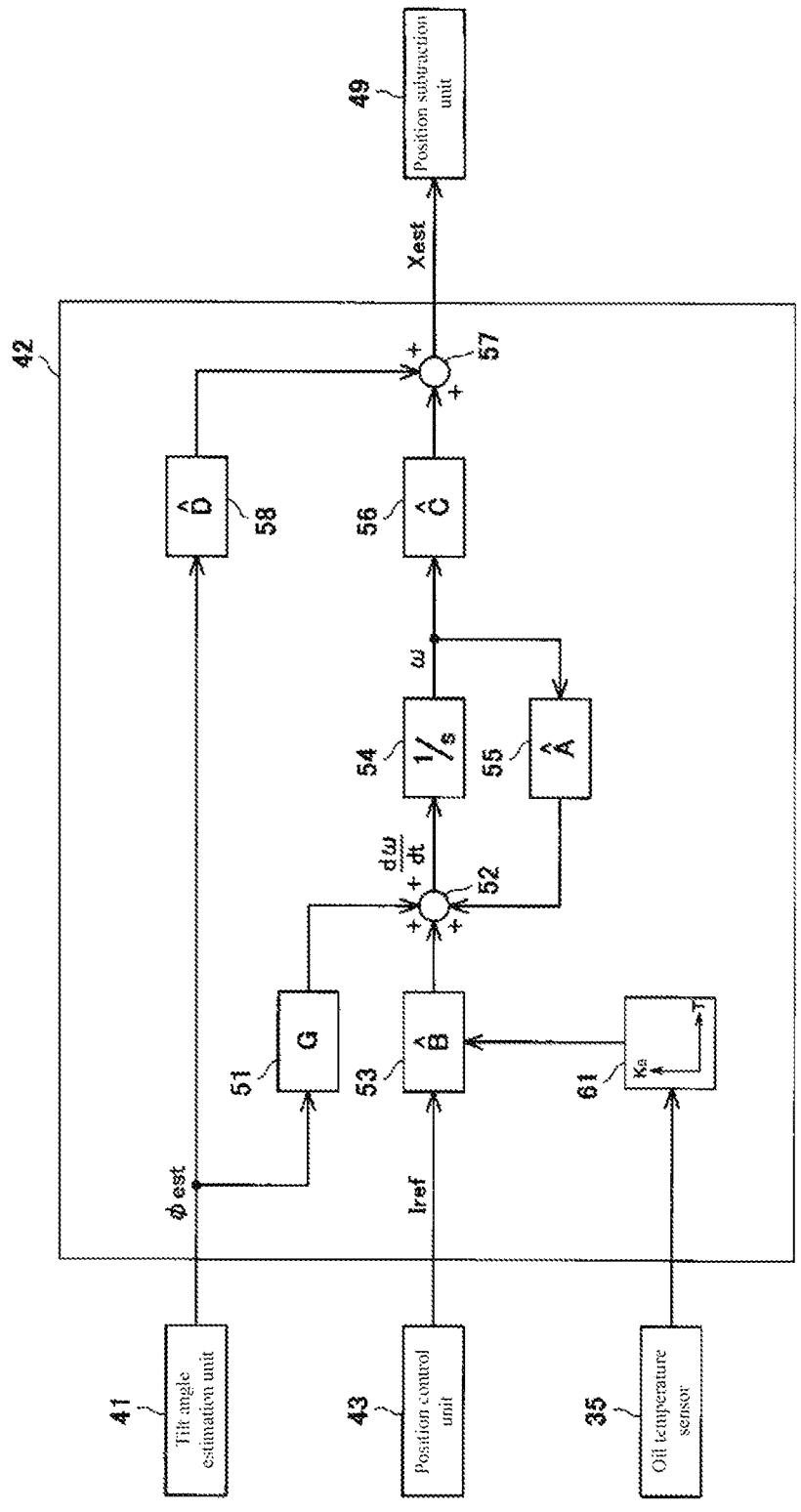
[Fig. 5]

[Fig. 6]
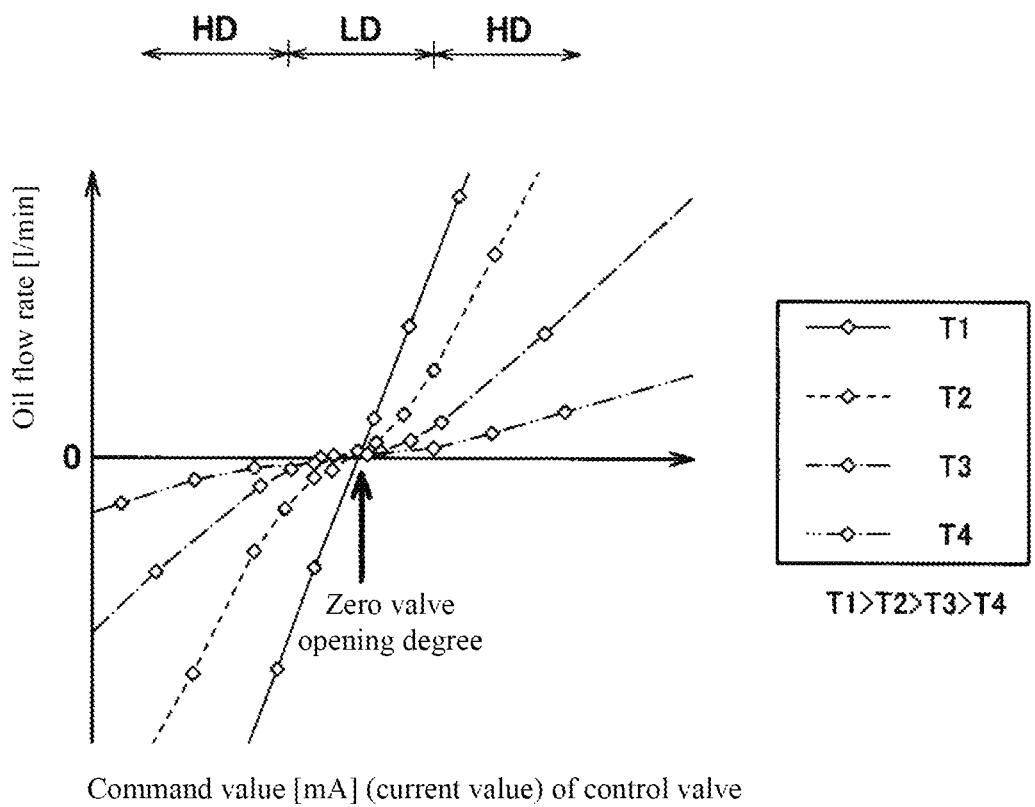

[Fig. 9]
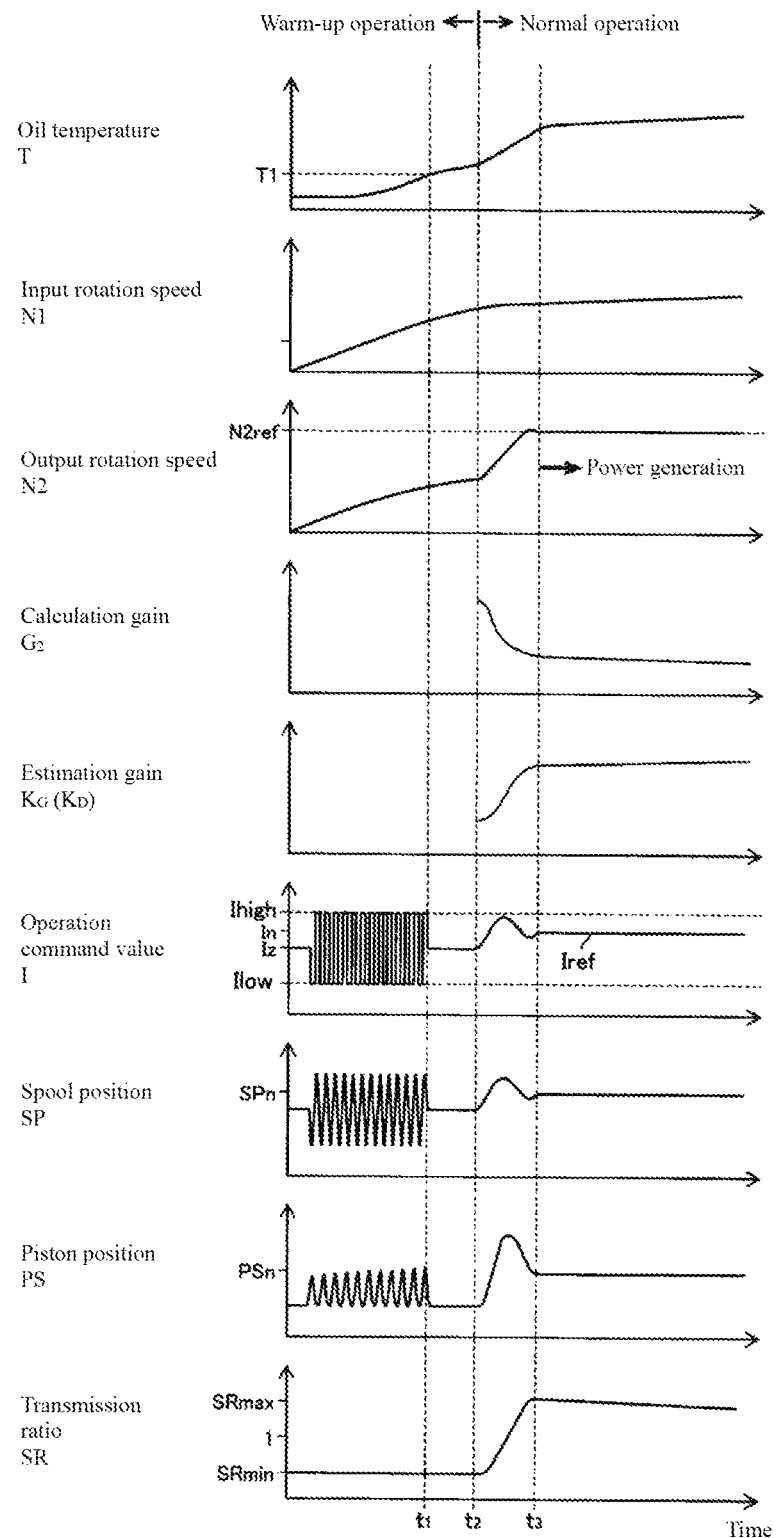

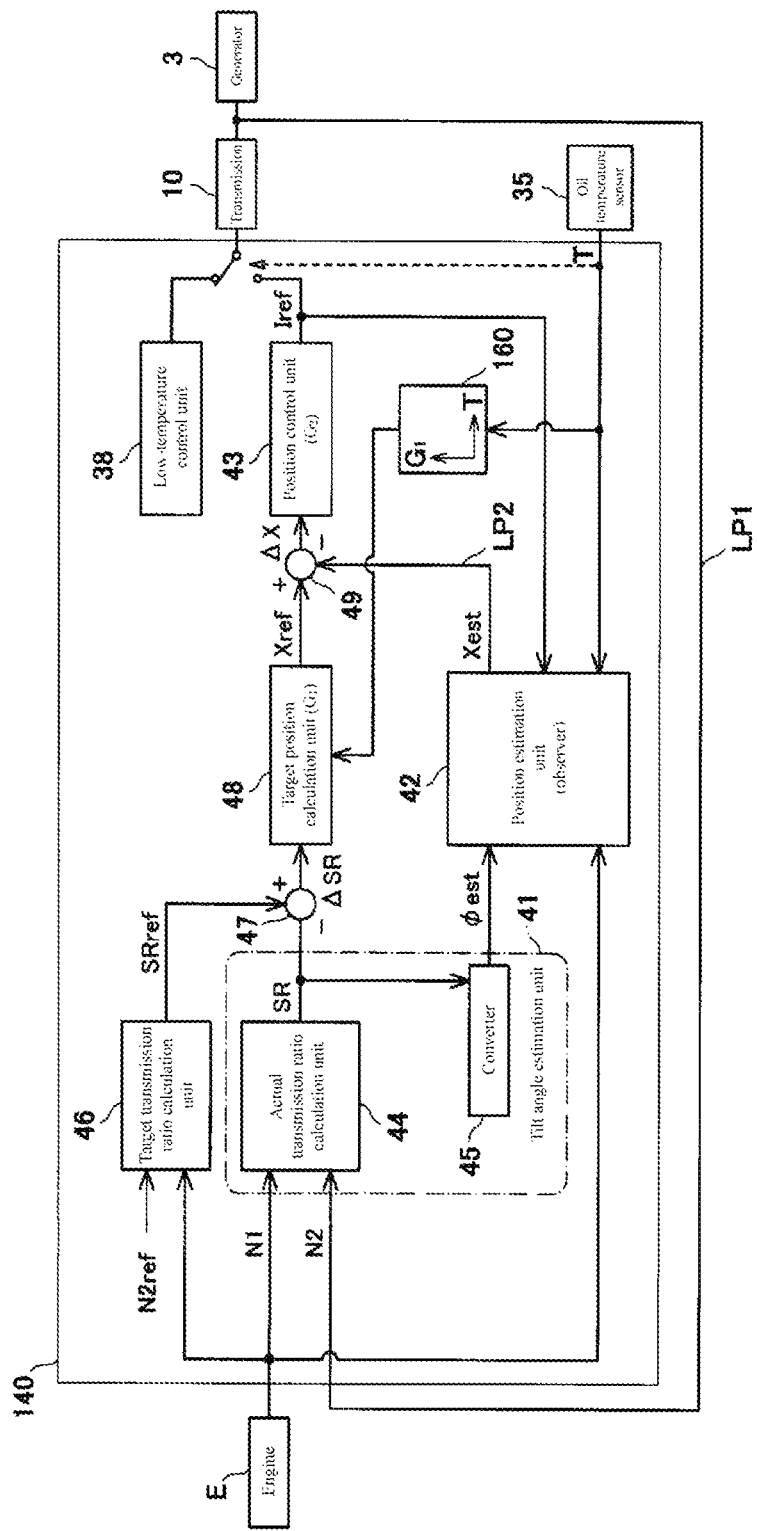
[Fig. 10]

POSITION CONTROLLER

CROSS REFERENCE TO RELATED APPLICATIONS

This application is a National Stage of International Application No. PCT/JP2018/018953 filed May 16, 2018, claiming priority based on Japanese Patent Application No. 2017-108177, filed May 31, 2017.

TECHNICAL FIELD

The present invention relates to a position controller that performs position control by outputting a drive signal to a control valve of a hydraulic actuator.

BACKGROUND ART

In a toroidal continuously variable transmission, power rollers are displaced by a hydraulic mechanism in order to change the transmission ratio. However, at the time of startup in a cold region, response to the operation of the power roller is delayed due to a decrease in fluidity of the oil, and hence a warm-up operation is required at the time of low-temperature startup. As an example of the warm-up operation, in Patent Literature 1, in the warm-up operation at the time of low-temperature startup, a spool of a control valve of the hydraulic mechanism is reciprocated within a range in which the transmission is maintained in a speed-reduced state to vibrate the piston. In this manner, low-temperature control to promote warm-up by flowing oil is performed. When the oil temperature reaches the reference temperature, normal control for controlling the control valve so that the transmission ratio approaches the command value by closed-loop control is started.

CITATION LIST

Patent Literature

PTL 1: JP4495117 B2

SUMMARY OF INVENTION

Technical Problem

By the way, in recent years, further shortening of the warm-up operation is desired for the early startup of the transmission, but if the reference temperature at which the warm-up operation is switched to the normal operation is lowered and the normal control is started earlier, the fluidity of the oil Is insufficient, and hence the closed-loop control may become unstable for a while in the initial stage of the normal control. For this reason, there is a limit to shortening the warm-up operation.

Therefore, an object of the present invention is to prevent the instability of closed-loop control after switching from a warm-up operation to a normal operation while shortening the warm-up operation at the time of low-temperature startup.

Solution to Problem

According to one aspect of the present invention, there is provided a position controller that performs position control by outputting a drive signal to a control valve of a hydraulic actuator that changes an operation position of an object, the position controller comprising: an oil temperature acquisition unit that acquires information on an oil temperature of the hydraulic actuator; a position acquisition unit that acquires an actual value of an operation position of the object; a position control unit that calculates an operation command value for the control valve by closed-loop control so as to reduce a deviation between a target value of the operation position of the object and the actual value; and a gain setting unit that changes at least one gain of the closed-loop control so that sensitivity of the closed-loop control increases as the oil temperature decreases. The object may be a transmission element that changes a transmission ratio of a continuously variable transmission in accordance with a position change thereof.

According to the above-described configuration, the gain of the closed-loop control for calculating the operation command value for the control valve so as to reduce the deviation between the target value and the actual value of the operation position of the object is adjusted to change so that the sensitivity of the closed-loop control increases as the oil temperature decreases. Therefore, it is possible to compensate a response delay due to a decrease in fluidity of oil at a low temperature. Therefore, it is possible to prevent the instability of the closed-loop control after switching from the warm-up operation to the normal operation while shortening the warm-up operation at the time of low-temperature startup.

The at least one gain may include a first gain used to obtain the operation command value from the deviation, and the gain setting unit may increase the first gain as the oil temperature decreases. For example, the first gain may be a calculation gain of the position control unit.

According to the above-described configuration, as the oil temperature decreases, the responsiveness of the operation command value to the deviation between the target value and the actual value increases. Therefore, it is possible to suitably compensate a response delay due to a decrease in fluidity of oil at a low temperature.

The at least one gain may include a second gain used to obtain the actual value input to the position subtraction unit, and the gain setting unit may decrease the second gain as the oil temperature decreases. For example, the position acquisition unit may be a position estimation unit that estimates the actual value of the operation position of the object, and the second gain may include sensitivity of an internal model of the position estimation unit.

According to the above-described configuration, as the oil temperature decreases, the actual value input to the position subtraction unit is adjusted to increase the deviation, so that the sensitivity of the closed-loop control increases. Therefore, it is possible to compensate a response delay due to a decrease in fluidity of oil at a low temperature.

The object may be a transmission element that changes a transmission ratio of a continuously variable transmission in accordance with a position change thereof.

According to the above-described configuration, the closed-loop control of the transmission ratio using the hydraulic actuator can be started stably and quickly at the time of low-temperature startup of the transmission.

According to another aspect of the present invention, there is provided a position controller that performs position control by outputting a drive signal to a control valve of a hydraulic actuator that changes an operating position of a transmission element so as to change a transmission ratio of a continuously variable transmission, the position controller comprising: an oil temperature acquisition unit that acquires information of an oil temperature of the hydraulic actuator;

an actual transmission ratio acquisition unit that acquires an actual value of the transmission ratio; a position acquisition unit that acquires an actual value of an operation position of the transmission element; a target position calculation unit that calculates a target value of the operating position of the transmission element by first closed-loop control so as to reduce a deviation between a command value of the transmission ratio and the actual value of the transmission ratio; a position control unit that calculates an operation command value for the control valve by second closed-loop control so as to reduce a deviation between the target value of the operation position of the transmission element and the actual value of the operation position of the transmission element; and a gain setting unit that changes a gain of the first closed-loop control so that sensitivity of the first closed-loop control decreases as the oil temperature decreases.

In the configuration in which the second closed-loop control (minor closed-loop control) for calculating the operation command value for the control valve is executed so as to reduce the deviation between the target value and the actual value of the operation position of the transmission element together with the first closed-loop control (major closed-loop control) for calculating the target value of the operation position of the transmission element so as to reduce the deviation between the command value and the actual value of the transmission ratio, the gain of the first closed-loop control is adjusted to change so that the sensitivity of closed-loop control decreases as the oil temperature decreases. Therefore, the responsiveness of the major closed-loop control decreases in accordance with a decrease in the responsiveness of the minor closed-loop control due to a decrease in fluidity of oil, and continuous vibration of the transmission ratio can be prevented. Therefore, it is possible to prevent the instability of the closed-loop control after switching from the warm-up operation to the normal operation while shortening the warm-up operation at the time of low-temperature startup.

The continuously variable transmission may be a toroidal continuously variable transmission that changes the transmission ratio in accordance with a tilt angle of a power roller, and the transmission element may be the power roller.

According to the above-described configuration, the closed-loop control of the transmission ratio can be started stably and quickly at the time of low-temperature startup of the toroidal continuously variable transmission.

Power output from the continuously variable transmission may be input to a generator, and the generator may start a power generation operation with a delay from start of the closed-loop control. The gain adjustment may be performed at least in a period after the closed-loop control is started and before the power generation operation of the generator is started.

According to the above-described configuration, the power generation operation can be stably started early after the closed-loop control is started.

In the gain adjustment, correction may be performed so that an absolute value of a change rate of the gain with respect to a change in the oil temperature increases when an opening degree of the control valve is in a second opening-degree region smaller than a first opening-degree region as compared to that when the opening degree of the control valve is in the first opening-degree region.

According to the above-described configuration, even if the viscosity resistance of the flow path is relatively large in the region where the opening degree of the control valve is small, the influence of viscosity is relieved by the increase in the absolute value of the change rate of the gain in the region where the opening degree of the control valve is small, and the nonlinearity between the valve opening degree and the oil flow rate is relieved. Therefore, it is possible to more suitably prevent the closed-loop control from becoming unstable.

Advantageous Effects of Invention

According to the present invention, it is possible to prevent the instability of the closed-loop control after switching from the warm-up operation to the normal operation while shortening the warm-up operation at the time of low-temperature startup.

BRIEF DESCRIPTION OF DRAWINGS

FIG. 1 is a skeleton diagram of an integrated drive generator according to a first embodiment.

FIG. 2 is a hydraulic circuit diagram of the integrated drive generator shown in FIG. 1.

FIG. 3 is a cross-sectional view of a control valve shown in FIG. 2.

FIG. 4 is a block diagram of a transmission controller of the integrated drive generator shown in FIG. 1.

FIG. 5 is a block diagram of an internal model of a position estimator shown in FIG. 4.

FIG. 6 is a graph showing a test result of the relationship between a command value (drive current) of a control valve and an oil flow rate.

FIG. 9 is a timing chart showing an example of the oil temperature at the time of startup by a transmission controller shown in FIG. 4 and other temporal changes.

FIG. 10 is a block diagram of a transmission controller according to Embodiment 2.

DESCRIPTION OF EMBODIMENTS

Figure 7A:
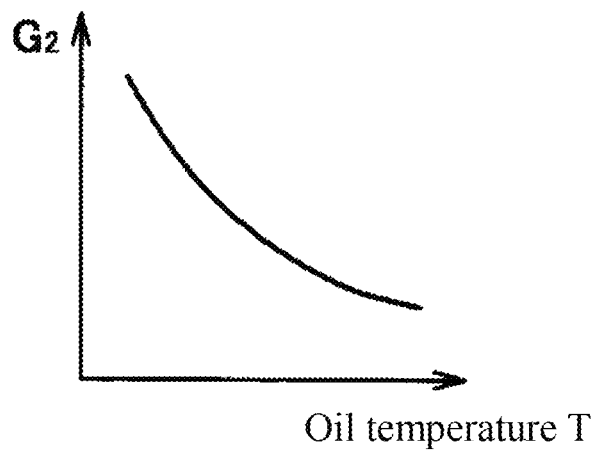
FIG. 7(A) is a graph showing the relationship between a calculation gain and an oil temperature of a position control unit shown in FIG. 4.

Hereinafter, embodiments will be described with reference to the drawings.

Embodiment 1

FIG. 1 is a skeleton diagram of an integrated drive generator 1 according to Embodiment 1. As shown in FIG. 1, the integrated drive generator (hereinafter referred to as "IDG") 1 is used as an AC power supply for an aircraft. At the time of startup of the IDG1, even if rotational power of an engine rotary shaft of an aircraft starts to be transmitted to the IDG1, until the IDG1 can be stably operated, electrical components in the aircraft are driven by an auxiliary power supply that is different from the IDG1 (for example, an external generator or an auxiliary generator). When the IDG1 can be stably operated, the power supply of the electrical components is switched from the auxiliary power supply to the IDG1. Since the IDG1 is used as a main power supply of the aircraft, the power supply is switched from the auxiliary power supply to the IDG1 before takeoff.

The IDG1 includes a casing 2 attached to an engine of an aircraft, and a generator 3 is accommodated in the casing 2 together with a constant speed drive (hereinafter, referred to as "CSD") 4. The CSD4 forms a power transmission path that transmits the rotational power of the engine rotary shaft (not shown) of the aircraft to the generator 3, and a toroidal continuously variable transmission 10 (hereinafter referred to as "toroidal CVT") forms a part thereof. The rotational power of the engine rotary shaft is input to the toroidal CVT10 via an input path 5 of the CSD4, is changed in gear by the toroidal CVT10, and is output to a generator shaft 7 via an output path 6 of the CSD4. When the generator shaft 7 rotates, the generator 3 generates AC power at a frequency which is proportional to the rotation speed of the generator shaft 7. The transmission ratio SR of the toroidal CVT10 is continuously changed so as to keep the rotation speed of the generator shaft 7 at an appropriate value (value corresponding to the frequency at which the electrical components in the aircraft are stably operated) regardless of fluctuations in the rotation speed of the engine rotary shaft. In this way, the frequency of the AC power generated by the generator 3 is maintained at an appropriate value, and the electrical components in the aircraft are stably operated.

In the toroidal CVT10, a CVT input shaft 11 and a CVT output shaft 12 are coaxially arranged on the CVT axis line A1. Input discs 13 are provided on the CVT input shaft 11 so as to be integrally rotatable, and output discs 14 are provided on the CVT output shaft 12 so as to be integrally rotatable. The input disc 13 and the output disc 14 face each other and form an annular cavity 15. In the present embodiment, the toroidal CVT10 is a double cavity type, and includes two sets of input discs 13A and 13B and output discs 14A and 14B having the same structure, and two cavities 15A and 15B are arranged in the direction of the CVT axis line A1. Two power rollers 16 (objects) are arranged in one cavity 15, and each power roller 16 is supported by a trunnion 17 so as to be rotatable around the rolling axis line A3. The trunnions 17 correspond to the power rollers 16, respectively, in a one-to-one correspondence. The trunnions 17 are supported by the casing 2 so that each of the trunnions 17 is displaceable in the extension direction of the tilt axis line A2 and is rotatable around the tilt axis line A2.

The power rollers 16 are supplied with traction oil, and pushed against the discs 13 and 14 by a clamping force generated by a clamping mechanism 18. The clamping mechanism 18 may be a cam type (sometimes referred to as a loading cam mechanism) or a hydraulic mechanism. As a result, a high-viscosity oil film is formed on the input side contact portion (contact interface between the power roller 16 and the input disc 13) and the output side contact portion (contact interface between the power roller 16 and the output disc 14). The CVT input shaft 11 is driven to rotate by the rotational power input from the input path 5. With the rotation of the CVT input shaft 11, the input discs 13 rotate together with the CVT input shaft 11 and the power rollers 16 are driven to rotate around the rolling axis line A3 by a shear resistance of the oil film which is generated in the input side contact portion. With the rotation of the power rollers 16 around the rolling axis line A3, the output discs 14 are driven to rotate by a shearing resistance of the oil film which is generated on the output side contact portion, and the CVT output shaft 12 rotates integrally therewith. The rotational power of the CVT output shaft 12 is output to the output path 6.

The transmission ratio SR is continuously changed in accordance with the roller positions X (positions in the extending directions of the tilt axis lines A2 of the power rollers 16). The transmission ratio SR is defined as the ratio of the output rotation speed (rotation speed of the CVT output shaft 12) N2 to the input rotation speed (rotation speed of the CVT input shaft 11) N1 of the toroidal CVT10, and is equal to the radius ratio ($SR=N2/N1=r_{in}/r_{out}$). The radius ratio is a ratio of the input side contact radius $r_{in}$ (distance from the CVT axis line A1 to the input side contact portion) to the output side contact radius $r_{out}$ (distance from the CVT axis line A1 to the output side contact portion). With the change in the roller positions X, the power rollers 16 rotate around the tilt axis lines A2 until a side slip is ceased, and tilt angles $\varphi$ (rotation angles of the power rollers 16 around the tilt axis lines A2) are changed. With the change in the tilt angles $\varphi$, the input side contact portions and the output side contact portions are displaced, and hence the input side contact region radiuses $r_{in}$ and the output side contact region radiuses $r_{out}$ are continuously changed. Therefore, the radius ratio, that is, the transmission ratio SR is continuously changed.

FIG. 2 is a hydraulic circuit diagram of the integrated drive generator 1 shown in FIG. 1. As shown in FIG. 2, the roller positions X are changed by a hydraulic actuator 20. The hydraulic actuator 20 includes a plurality of hydraulic cylinders 21. The hydraulic cylinders 21 correspond to the power rollers 16 and the trunnions 17, respectively, in a one-to-one correspondence. The hydraulic cylinders 21 each include a body 21a, a piston 21b, and a rod 21c. The hydraulic cylinder 21 is a double-acting type, and the inside of the body 21a is partitioned into a speed increase chamber 22 and a speed reduction chamber 23 by the piston 21b. The rod 21c is arranged coaxially with the tilt axis line A2, connects the piston 21b to the trunnion 17, and moves in the extending direction of the tilt axis line A2 together with the trunnion 17 and the power roller 16 supported by the trunnion 17.

When oil is supplied to the speed increase chambers 22 and discharged from the speed reduction chambers 23, the roller positions X are changed to the speed increase side in the extending direction of the tilt axis lines A2. When the oil flows in the opposite direction, the roller positions X are changed to the speed reduction side that is the opposite side to the speed increase side in the extending direction of the tilt axis lines A2. The two power rollers 16 arranged in one cavity 15 are displaced in opposite directions in the extending direction of the tilt axis lines A2 in order to keep the radius ratio equal to each other when the roller positions X are changed.

When the roller positions X are changed to the speed increase side, the tilt angles $\varphi$ increase and the transmission ratio SR increases. When the roller positions X are changed to the speed reduction side, the tilt angles $\varphi$ decrease and the transmission ratio SR decreases. When the roller positions X reaches the upper limit points $X_{max}$, the tilt angles $\varphi$ become the maximum tilt angles $\varphi X_{max}$, and the transmission ratio SR exceeds the maximum transmission ratio $SRX_{max}$, which exceeds 1. When the roller positions X reach the lower limit points $X_{min}$, the tilt angles $\varphi$ become the minimum tilt angles $\varphi_{min}$, and the transmission ratio SR becomes the minimum transmission ratio $SR_{min}$ which is less than 1. The allowable tilt range of the power roller 16 is mechanically determined by a stopper (not shown) provided on the trunnion 17 to prevent excessive tilting. If the roller positions X are the neutral points $X_n$, the tilt angles φ become the neutral angles φn, and the transmission ratio SR becomes 1. The neutral angle φn is approximately equal to the median value of the allowable tilt range, and the minimum transmission ratio $SR_{min}$ is approximately equal to the reciprocal of the maximum transmission ratio $SRX_{max}$.

The hydraulic actuator 20 further includes a control valve 25. The hydraulic cylinders 21 correspond to the power rollers 16, respectively, in a one-to-one correspondence, whereas the control valve 25 is single for the plurality of power rollers 16, for example. The control valve 25 is a four-way switching valve, and has a supply port PS, a return port PT, a speed-increase control port CA, and a speed-reduction control port CB. A hydraulic pump 27 that sucks oil from the oil tank 26 is connected to the supply port PS, and the return port PT is connected to the oil tank 26. The speed-increase control port CA is connected to the speed increase chambers 22, and the speed reduction chambers 23 are connected to the speed-reduction control port CB. The control valve 25 is a spool valve, and the connection states of the ports are switched in accordance with the position of a spool 28. The control valve 25 is a three-position switching valve, and the spool 28 is positioned in the shut-off region (center position in FIG. 2), the speed increase region (left position in FIG. 2), or the speed reduction region (right position in FIG. 2).

In the shut-off region, the control ports CA, CB are cut-off from the supply port PS and the return port PT. At this time, the supply/discharge of oil to/from the speed increase chamber 22 and the speed reduction chamber 23 is stopped, and the transmission ratio is maintained. In the speed increase region, the speed-increase control port CA is connected to the supply port PS and the speed-reduction control port CB is connected to the return port PT. At this time, oil is supplied to the speed increase chamber 22 and discharged from the speed reduction chamber 23, and the transmission ratio increases. In the speed reduction region, the speed-increase control port CA is connected to the return port PT and the speed-reduction control port CB is connected to the supply port PS. At this time, oil is supplied to the speed reduction chamber 23 and discharged from the speed increase chamber 22, and the transmission ratio decreases. When the spool 28 is positioned in the speed increase region or the speed reduction region, the opening degrees of the supply port PS and the return port PT are variably set in accordance with the spool position in the region.

The control valve 25 includes a drive unit 29 that drives the spool 28 to control the spool position and opening degrees. The flow rate and pressure of oil supplied/discharged to/from the speed increase chamber 22 and the speed reduction chamber 23 are adjusted by the drive unit 29. The control valve 25 is an electric valve, and the drive unit 29 receives a drive signal from a transmission controller 40 (position controller) and controls the spool position and opening degrees in accordance with the output value I (current value) of the drive signal.

An IDG2 is provided with an oil temperature sensor 35 (oil temperature acquisition unit) that detects the temperature of the hydraulic oil in the hydraulic actuator 20. The oil temperature sensor 35 may be arranged anywhere as long as it can detect the temperature of the oil flowing through the hydraulic circuit of the hydraulic actuator 20, but as an example, the oil temperature sensor 35 is arranged at a position for detecting the temperature of the oil stored in the oil tank 26.

FIG. 3 is a cross-sectional view of the control valve 25 shown in FIG. 2. As shown in FIG. 3, the control valve 25 is a nozzle flapper type servo valve. The drive unit 29 includes a motor unit 31 that generates torque when a drive signal is input, a nozzle flapper unit 32 that displaces the spool 28 in accordance with the torque generated by the motor unit 31, and a feedback unit 33 that operates the motor unit 31 and the nozzle flapper unit 32 in accordance with the displacement of the spool 28.

In the motor unit 31, when a drive signal is input to a coil 31a, a torque corresponding to the polarity and magnitude of the drive signal is generated in an armature 31d based on the magnetic force acting between upper and lower magnetic poles 31b and 31c and the armature 31d. As a result, the armature 31d is inclined with respect to the upper and lower magnetic poles 31b and 31c. In the nozzle flapper unit 32, a flapper 32a integrated with the armature 31d is displaced in conjunction with the inclination of the armature 31d. As a result, the amount of orifice restriction between the flapper 32a and a left nozzle 32b and the amount of orifice restriction between the flapper 32a and a right nozzle 32c change, and the balance of the nozzle back pressures is broken (the nozzle back pressure on the side that the flapper 32a approaches increases and the nozzle back pressure on the side from which the flapper 32a separates away decreases). Both end surfaces of the spool 28 receive the left nozzle back pressure and the right nozzle back pressure, respectively, and the spool 28 starts to be displaced as the nozzle back pressures are imbalanced. The feedback unit 33 is configured by, for example, a spring 33a supported by the spool 28 and the armature 31d. When the spool 28 is displaced, a torque opposite to the torque based on the magnetic force is generated in the spring 33a, and the flapper 32a and the armature 31d are returned to the neutral position by the torque. Thereby, the balance of the nozzle back pressures is obtained and the spool 28 is stopped. Based on the above-described principle, the spool position and the opening degrees corresponding to the polarity and magnitude of the drive signal can be obtained.

The hydraulic actuator 20 includes a bias mechanism (not shown) that forcibly holds the roller positions X at predetermined positions when the drive signal satisfies a predetermined condition. For example, the bias mechanism forcibly returns the roller positions X to the lower limit points $X_{min}$ when the condition that the output value I is the zero value $I_z$ is satisfied, and maintains the transmission ratio SR at the minimum transmission ratio $SR_{min}$, on the safe side. Even when the condition that the output value I is a negative value is satisfied, the roller positions X are forcibly returned to the lower limit points $X_{min}$. The bias mechanism is realized by mechanically giving the armature 31d a constant initial inclination with respect to its neutral position. If the output value I is the zero value $I_z$, a differential pressure corresponding to the initial inclination occurs between the right and left nozzle back pressures. As a result, the spool 28 is positioned not at the neutral position $SP_n$ in the shut-off region but at the bias position in the speed reduction region.

If the output value I becomes the zero value $I_z$ and the spool 28 is maintained at the bias position, the roller positions X, the tilt angles φ, and the transmission ratio SR reach the lower limit points $X_{min}$, the minimum tilt angles $φ_{min}$, and the minimum transmission ratio $SR_{min}$, respectively, and are maintained thereat. Conversely, in order to maintain the roller positions X by positioning the spool 28 at the neutral position $SP_n$ in the shut-off region, it is necessary to set the output value I of the drive signal so that torque required for canceling the initial tilt is generated in the armature 31d to continue energizing the coil 31a with the drive signal. Hereinafter, the output value I for obtaining the neutral position $SP_n$ is referred to as "neutral value $I_n$".

FIG. 4 is a block diagram of the transmission controller 40 of the integrated drive generator 1 shown in FIG. 1. As shown in FIG. 4, the transmission controller 40 includes a tilt angle estimation unit 41 that obtains the estimated value $\varphi_{est}$ which is a value obtained by estimating the actual value of the tilt angle, a position estimation unit 42 (position acquisition unit) that obtains estimated values $X_{est}$ which are values obtained by estimating actual values of the roller positions, and a position control unit 43 that obtains the operation command value $\varphi_{est}$ of the hydraulic actuator 20 so as to eliminate the deviation $\Delta X$ between target values $X_{ref}$ and the estimated values $X_{est}$ of the roller positions. The tilt angle estimation unit 41 obtains the estimated value $\varphi_{est}$ of the tilt angle by calculation without using a sensor that directly detects the tilt angle. The operation command value $I_{ref}$ is, for example, an output value (current value) of a drive signal given to the control valve 25 of the hydraulic actuator 20.

The tilt angle estimation unit 41 includes an actual transmission ratio calculation unit 44 (actual transmission ratio acquisition unit) that obtains the actual transmission ratio SR, and a converter 45 that converts the actual transmission ratio SR into the estimated value $\varphi_{est}$ of the tilt angle. The actual transmission ratio calculation unit 44 obtains the actual transmission ratio SR in accordance with the ratio between the input rotation speed N1 of the toroidal CVT 10 (rotation speed of the engine E) and the output rotation speed N2 of the toroidal CVT 10. The input rotation speed N1 and the output rotation speed N2 are detected by an input rotation speed sensor and an output rotation speed sensor, respectively.

The converter 45 obtains the estimated value $\varphi_{est}$ that is a value obtained by estimating the tilt angle in accordance with the actual transmission ratio SR based on the inverse function ($\varphi = f^{-1}(SR)$) of the function of the tilt angle $\varphi$ with respect to the actual transmission ratio SR. The converter 45 may actually perform the arithmetic operation of the inverse function. Further, in order to reduce the calculation load, a table in accordance with the inverse function may be created in advance and stored in the transmission controller 40, and the estimated value $\varphi_{est}$ may be obtained by table processing.

The transmission controller 40 includes a target transmission ratio calculation unit 46 that obtains the command value $SR_{ref}$ of the transmission ratio. The target transmission ratio calculation unit 46 calculates the command value $SR_{ref}$ of the transmission ratio in accordance with the ratio between the input rotation speed N1 detected by the input rotation speed sensor and the command value $N2_{ref}$ of the output rotation speed stored in advance. In the present embodiment, the command value $N2_{ref}$ of the output rotation speed is set to a constant value corresponding to a frequency suitable for the operation of electrical components in the aircraft. For example, when the target frequency fref is 400 Hz, the number of poles of the generator 3 is 2, and the detection target of the output rotation speed sensor is the rotation speed of the generator shaft 7, the command value $N2_{ref}$ is a constant value of 24,000 rpm.

The transmission controller 40 includes a transmission ratio subtraction unit 47 that obtains the deviation $\Delta SR$ between the command value SRref of the transmission ratio and the actual transmission ratio SR ($\Delta SR = SRref - SR$). The transmission controller 40 includes a target position calculation unit 48 that calculates the target values Xref of the roller positions so as to reduce the deviation $\Delta SR$ of the transmission ratio. That is, the target position calculation unit 48 calculates the target values Xref of the roller positions with the predetermined calculation gain G1 (a first gain) so that the deviation $\Delta SR$ approaches zero by major closed-loop control LP1 (first closed-loop control; feedback control). In the present embodiment, the calculation gain G1 is constant.

The transmission controller 40 includes a position subtraction unit 49 that obtains the deviation $\Delta X$ between the target values Xref and the estimated values Xest of the roller positions ($\Delta X = Xref - Xest$). The position control unit 43 calculates the operation command value Iref of the hydraulic actuator 20 so as to reduce the deviation $\Delta X$. That is, the position control unit 43 calculates the operation command value Iref with the predetermined calculation gain G2 (a first gain) so that the deviation $\Delta X$ approaches zero by minor closed-loop control LP2 (second closed-loop control; feedback control). The calculation gain G2 will be described later.

The minor closed-loop control LP2 returning to the position subtraction unit 49 is a loop included in the major closed-loop control LP1 returning to the transmission ratio subtraction unit 47. When the control valve 25 of the hydraulic actuator 20 is given a drive signal indicated by the operation command value $I_{ref}$, the actual roller positions are brought closer to the target values $X_{ref}$. Then, the actual transmission ratio SR is brought closer to the command value $SR_{ref}$, and the output rotation speed N2 is brought closer to the command value $N2_{ref}$. For control stability, it is desired that the sensitivity of the minor closed-loop control LP2 (roller position control) is higher than the sensitivity of the major closed-loop control LP1 (transmission ratio control). That is, it is desired that the ratio ($\Delta I_{ref}/\Delta X_{ref}$) of the change rate of the output (operation command value $I_{ref}$) to the change rate of the input (target value $X_{ref}$) of the minor closed-loop control LP2 is higher than the ratio ($\Delta X_{ref}/\Delta SR_{ref}$) of the change rate of the output (target value $X_{ref}$) to the change rate of the input (command value $SR_{ref}$) of the major closed-loop control LP1.

The position control unit 43 performs gain adjustment to increase the calculation gain $G_2$ of the operation command value $I_{ref}$ at a predetermined change rate as the oil temperature detected by the oil temperature sensor 35 becomes lower. Specifically, the position control unit 43 calculates the operation command value $I_{ref}$ based on the calculation gain $G_2$ determined by a gain setting unit 60 in accordance with the oil temperature T detected by the oil temperature sensor 35.

As described above, the transmission controller 40 implements a feedback control function for normal control by the tilt angle estimation unit 41, the position estimation unit 42, the position control unit 43, the target transmission ratio calculation unit 46, the transmission ratio subtraction unit 47, the target position calculation unit 48, and the position subtraction unit 49, and the transmission controller 40 further includes a low-temperature control unit 38 that implements a feed-forward control function for low-temperature control at the time of startup. The control by the low-temperature control unit 38 and the control by the position control unit 43 are switched to each other in accordance with the oil temperature detected by the oil temperature sensor 35.

FIG. 5 is a block diagram of an internal model of the position estimation unit 42 shown in FIG. 4. As shown in FIG. 5, the position estimation unit 42 is an observer created using the models of the tilt angles φ and the model of the hydraulic actuator 20, and estimates the roller positions X. The models of the tilt angles φ are expressed by Expression (1), and the model of the hydraulic actuator 20 is expressed by Expression (2).

[Math. 1]
$$\phi = \frac{K_2}{s(1+T_2 s)} X \tag{1}$$

[Math. 2]
$$X = \frac{K_1}{s} Iref \tag{2}$$

Here, K1 is a first proportional gain, K2 is a second proportional gain, T2 is a time constant, and s is a Laplace operator.

With Expressions (1) and (2), a model for designing an observer is expressed by Expression (3).

[Math. 3]
$$X \cong \frac{K}{s^2} Iref \tag{3}$$

Here, $K = K_1 K_2$ and $T_2 \approx 0$.

Next, the matrices A and B expressed in the state space are divided as shown in Expression (4) to (6).

[Math. 4]
$$\frac{dx}{dt} = Ax + BIref \tag{4}$$

[Math. 5]
$$X = Cx \tag{5}$$

[Math. 6]
$$\{A, B, C\} = \left\{ \begin{pmatrix} 0 & K_1 \\ 0 & 0 \end{pmatrix}, \begin{pmatrix} 0 \\ K_2 \end{pmatrix}, (1\ 0) \right\} \tag{6}$$

Here, x is a state variable. At this time, Expression (7) and (8) hold.

[Math. 7]
$$A := \begin{pmatrix} A_{11} & A_{12} \\ A_{21} & A_{22} \end{pmatrix} \tag{7}$$

[Math. 8]
$$B := \begin{pmatrix} B_1 \\ B_2 \end{pmatrix} \tag{8}$$

Therefore, $A_{11}=A_{21}=A_{22}=B_1=0$, $A_{12}=K_1$, and $B_2=K_2$ hold.

Next, the determinant design parameter L is introduced as shown in Expression (9), and the observer pole (the eigenvalue of the estimated matrix ^A) is adjusted to be stable.

[Math. 9]
$$\hat{A} = A_{22} - L A_{12} \tag{9}$$

Other parameters (estimated matrix ^B, matrix G, estimated matrix ^C, and estimated matrix ^D) are obtained using design parameter L in accordance with Expressions (10) to (13).

[Math. 10]
$$\hat{B} = -LB_1 + B_2 \tag{10}$$

[Math. 11]
$$G = \hat{A}L + A_{21} - LA_{11} \tag{11}$$

[Math. 12]
$$\hat{C} = \begin{pmatrix} 0 \\ 1 \end{pmatrix} \tag{12}$$

[Math. 13]
$$\hat{D} = \begin{pmatrix} 1 \\ L \end{pmatrix} \tag{13}$$

From the above, the minimum dimension observer represented by Expressions (14) and (15) is obtained from the models of the tilt angles φ (see Expression (1)) and the model of the hydraulic actuator 20 (see Expression (2)).

[Math. 14]
$$\frac{d\omega}{dt} = \hat{A}\omega + \hat{B}Iref + G\phi est \tag{14}$$

[Math. 15]
$$Xest = \hat{C}\omega + \hat{D}\phi est \tag{15}$$

Here, ω is the state of the minimum dimension observer.

The position estimation unit 42 obtains the estimated values $X_{est}$ of the roller positions (see Expression (15)) by performing calculations in accordance with Expressions (14) and (15). In the position estimation unit 42, the estimated value $\varphi_{est}$ of the tilt angle is given to the arithmetic circuit 51 having the matrix G from the tilt angle estimation unit 41, and $G\varphi_{est}$ (see Expression (14)) is given to an addition unit 52 from the arithmetic circuit 51. The operation command value $I_{ref}$ of the hydraulic actuator 20 is given from the position control unit 43 to an arithmetic circuit 53 for the estimated matrix ^B, and ^$BI_{ref}$ (see Expression (14)) is given from the arithmetic circuit 53 to the addition unit 52. The output of the addition unit 52 is given to an integration circuit 54 having a transfer function 1/s, and the state ω is output from the integration circuit 54. The state ω is given to an arithmetic circuit 55 having the estimated matrix ^A, and ^Aω (see Expression (14)) is given from the arithmetic circuit 55 to the addition unit 52. The addition unit 52 derives a differential value dω/dt of the state ω by adding ^Aω, ^$BI_{ref}$, and Gφest (see Expression (14)), and gives this to the integration circuit 54.

The state ω is also given to an arithmetic circuit 56 for the estimated matrix ^C, and ^Cω (see Expression (15)) is given from the arithmetic circuit 56 to an addition unit 57. The estimated value $\varphi_{est}$ of the tilt angle is also supplied from the tilt angle estimation unit 41 to an arithmetic circuit 58 for the estimated matrix ˆ D, and ˆ D_{φest} (see Expression (15)) is supplied from the arithmetic circuit 58 to the addition unit 57. The addition unit 57 derives the estimated values $X_{est}$ of the roller positions by adding ˆ Cω and ˆ D_{φest} (see Expression (15)), and outputs this to the position subtraction unit 49.

The arithmetic circuit 53 for the estimated matrix ˆ B derives the matrix ˆ B based on the internal gain KB (a second gain) determined by the gain setting unit 61 in accordance with the oil temperature T detected by the oil temperature sensor 35. In this way, the position estimation unit 42 obtains the estimated values Xest of the roller positions based on the estimated value (φest of the tilt angle, the operation command value Iref of the hydraulic actuator 20, and the oil temperature T of the hydraulic actuator.

FIG. 6 is a graph showing a test result of the relationship between the command value (drive current) of the control valve 25 and the oil flow rate. FIG. 6 shows the relationship between the command value of the control valve 25 and the oil flow rate at different oil temperatures T1 to T4 (T1>T2>T3>T4), and it is found that the oil flow rate decreases as the oil temperature decreases. That is, as the oil temperature decreases, the oil viscosity increases and the oil flow rate in the control valve 25 decreases. In FIG. 6, the oil flow rate decreases as the drive current of the control valve 25 approaches the value corresponding to zero valve opening degree, and the change rate of the oil flow rate accompanying the change in the valve opening degree has different nonlinearities between the low opening-degree region LD and the high opening-degree region HD. That is, the absolute value of the decrease rate of the oil flow rate accompanying the decrease in the valve opening degree is smaller in the low opening-degree region LD than in the high opening-degree region HD. In order to correct the influence of the oil temperature and the valve opening degree on the oil flow rate, the calculation gain $G_2$ of the position control unit 43 and its correction coefficient $C_{G2}$ are set as follows.

Figure 7B:
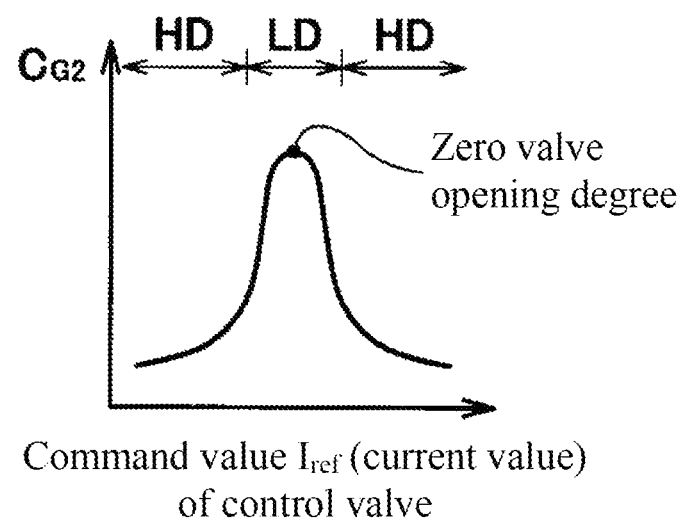
FIG. 7(B) is a graph showing the relationship between a correction coefficient of the calculation gain of the position control unit and an operation command value (drive current) of the control valve.

FIG. 7(A) is a graph showing the relationship between the calculation gain $G_2$ and the oil temperature T of the position control unit 43 shown in FIG. 4. FIG. 7(B) is a graph showing the relationship between the correction coefficient $C_{G2}$ of the calculation gain $G_2$ of the position control unit 43 and the operation command value $I_{ref}$ (drive current) of the control valve 25. As shown in FIG. 7(A), in the gain setting unit 60, the calculation gain $G_2$ of the position control unit 43 is set in advance so that the calculation gain $G_2$ increases as the oil temperature T decreases. The relationship between the calculation gain $G_2$ and the oil temperature T is similar to the relationship between the viscosity of the oil used in the hydraulic actuator 20 and the oil temperature T. In the present embodiment, the increase rate of the calculation gain $G_2$ per unit temperature decrease is set to increase as the oil temperature T decreases. The correspondence relationship between the calculation gain $G_2$ and the oil temperature T is defined by the gain setting unit 60 using, for example, a two-dimensional map, a table, or an arithmetic expression.

In this way, in the configuration in which the minor closed-loop control LP2 that calculates the operation command value $I_{ref}$ for the control valve 25 is executed in the position control unit 43 so as to reduce the deviation ΔX between the target values $X_{ref}$ and the estimated values $X_{est}$ (actual values) of the roller positions, the calculation gain $G_2$ of the operation command value $I_{ref}$ increases as the oil temperature T decreases, so that the sensitivity ($ΔI_{ref}/ΔX_{ref}$) of the closed-loop control increases as the oil temperature T decreases. Therefore, a response delay due to a decrease in fluidity of oil at a low temperature is compensated by an increase in the calculation gain $G_2$.

As shown in FIG. 7B, the calculation gain $G_2$ of the position control unit 43 is multiplied by the correction coefficient $C_{G2}$ that changes in accordance with the operation command value $I_{ref}$ (drive current) of the control valve 25. The correction coefficient $C_{G2}$ is set so that the absolute value of the change rate of the calculation gain $G_2$ per unit temperature change increases when the opening degree of the control valve 25 is in the low opening-degree region LD (second opening-degree region) smaller than the high opening-degree region as compared to that when the opening degree of the control valve 25 is in the high opening-degree region HD (first opening-degree region). In the present embodiment, when the opening degree α of the control valve 25 is to be fully open at 100% and fully closed at 0%, the low opening-degree region LD is, for example, a region including at least 0%<α<20%, and the high opening-degree region HD is, for example, a region including at least 80%<α<100%.

The calculation gain $G_2$ after correction takes a large value when the oil temperature T is low and the opening degree of the control valve 25 is small, and takes a small value when the oil temperature T is high and the opening degree of the control valve 25 is large. The relationship between the correction coefficient $C_{G2}$ and the operation command value $I_{ref}$ (drive current) is inversely correlated with the relationship between the absolute value of the change rate of the oil flow rate in FIG. 6 and the operation command value $I_{ref}$ (drive current). In this way, even if the viscosity resistance of the flow path is relatively large in the region where the opening degree of the control valve 25 is small, the influence of viscosity is relieved by the increase in the absolute value of the change rate of the calculation gain $G_2$ in the region where the opening degree of the control valve 25 is small, and the nonlinearity between the valve opening degree and the oil flow rate is relieved.

Figure 8A:
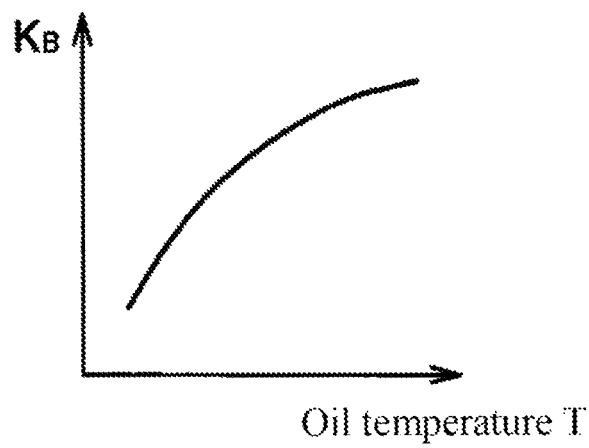
FIG. 8(A) is a graph showing the relationship between an internal gain and an oil temperature of the position estimation unit shown in FIG. 5.
Figure 8B:
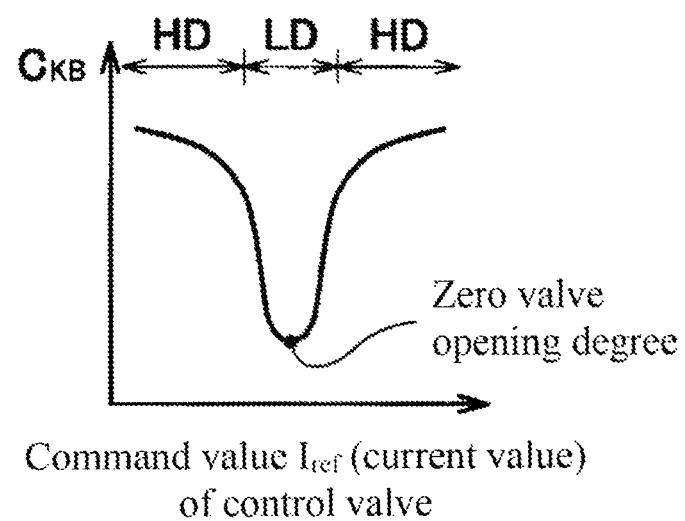
FIG. 8(B) is a graph showing the relationship between a correction coefficient of the internal gain of the position estimation unit and the operation command value (drive current) of the control valve.

FIG. 8(A) is a graph showing the relationship between the internal gain $K_B$ and the oil temperature T of the position estimation unit 42 shown in FIG. 5. FIG. 8(B) is a graph showing the relationship between the internal gain $K_B$ of the position estimation unit 42 and the operation command value $I_{ref}$ (current value) of the control valve. As shown in FIG. 8(A), in the gain setting unit 61, the internal gain $K_B$ of the arithmetic circuit 53 of the position estimation unit 42 is set in advance so that the gain $K_B$ decreases as the oil temperature T decreases. The relationship between the internal gain $K_B$ and the oil temperature T is inversely correlated with the relationship between the viscosity of the oil used in the hydraulic actuator 20 and the oil temperature T. In the present embodiment, the reduction rate of the internal gain $K_B$ per unit temperature decrease is set to increase as the oil temperature T decreases. The correspondence relationship between the internal gain $K_B$ and the oil temperature T is also defined by the gain setting unit 61 using, for example, a two-dimensional map, a table, or an arithmetic expression.

In this way, in the configuration in which the minor closed-loop control that calculates the operation command value $I_{ref}$ for the control valve 25 is executed in the position control unit 43 so as to reduce the deviation ΔX between the target values $X_{ref}$ and the estimated values $X_{est}$ (actual values) of the roller positions, as the oil temperature T decreases, the sensitivity ($ΔX_{est}/ΔI_{ref}$) of the internal model of the position estimation unit 42 decreases. Therefore, the position estimation unit 42 can perform accurate position estimation in consideration of the oil temperature, and the response delay due to the decrease in fluidity of the oil at a low temperature is further compensated.

As shown in FIG. 8(B), the internal gain $K_B$ of the position estimation unit 42 is multiplied by the correction coefficient $C_{KB}$ that changes in accordance with the operation command value $I_{ref}$ (current value) of the control valve 25. Similarly, the correction coefficient $C_{KB}$ is set so that the absolute value of the change rate of the internal gain $K_B$ per unit temperature change decreases when the opening degree of the control valve 25 is in the low opening-degree region (first opening-degree region) smaller than the high-opening degree region as compared to that when the opening degree of the control valve 25 is in the high opening-degree region (first opening-degree region). That is, when the oil temperature T is low and the opening degree of the control valve 25 is small, the internal gain $K_B$ takes a small value, whereas when the oil temperature T is high and the opening degree of the control valve 25 is large, the internal gain $K_B$ takes a large value. The relationship between the correction coefficient $C_{KB}$ and the operation command value $I_{ref}$ (drive current) is inversely correlated with the relationship between the absolute value of the change rate of the oil flow rate in FIG. 6 and the operation command value $I_{ref}$ (drive current).

In this way, even if the viscosity resistance of the flow path is relatively large in the region where the opening degree of the control valve 25 is small, the influence of viscosity is further relieved by the decrease in the absolute value of the change rate of the internal gain KB in the region where the opening degree of the control valve 25 is small, and the nonlinearity between the valve opening degree and the oil flow rate is further relieved.

FIG. 9 is a timing chart showing an example of the oil temperature T at the time of startup by the transmission controller 40 shown in FIG. 4 and other temporal changes. As shown in FIGS. 4 and 9, when the oil temperature T detected by the oil temperature sensor 35 is lower than the reference temperature T1 at the time of startup of the IDG1, a warm-up operation in which the control valve 25 is subjected to open-loop control by the low-temperature control unit 38 is executed. The reference temperature T1 is, for example, a value within a range of −20 to −10° C. When the warm-up operation is completed, the normal operation in which the control valve 25 is subjected to closed-loop control by the position control unit 43 is executed.

In the warm-up operation, the low-temperature control unit 38 outputs the operation command value I so as to reciprocate the spool 28. The waveform of the operation command value I is set, for example, such that the maximum value $I_{high}$ is a value larger than the neutral value $I_n$ and the minimum value $I_{low}$ is a value smaller than the neutral value $I_n$. As a result, oil flows alternately between the speed increase side and the speed reduction side in the control valve 25, and the piston 21b also vibrates slightly. Thus, the increase in the oil temperature T is promoted by forcibly causing the oil to flow by reciprocating the spool 28. Further, in the waveform of the operation command value I, the difference from the neutral value $I_n$ of the maximum value $I_{high}$ is smaller than the difference from the neutral value $I_n$ of the minimum value $I_{low}$. The spool 28 cannot respond sensitively to the operation command value I. Therefore, the piston 21b reciprocates on the speed reduction side with respect to the neutral position $PS_n$, and an excessive increase in the output rotation speed N2 is prevented.

When the oil temperature T reaches the reference temperature T1 (t1), the reciprocation of the spool 28 and the piston 21b is stopped, and the drive signal is output so that the roller positions X are maintained at predetermined positions (maximum speed-reduction positions) for a predetermined standby time by the action of the bias mechanism described above. Until the standby time elapses, the operation command value I is fixed at the bias mechanism operating value (zero value $I_z$). When the standby time elapses (t2), the warm-up operation is terminated and the normal operation is started.

In the normal operation, the position control unit 43 obtains the operation command value $I_{ref}$ by closed-loop control. That is, when the position control unit 43 outputs the operation command value $I_{ref}$ corresponding to the deviation ΔX, the roller position X is brought closer to the command value $X_{ref}$, and the transmission ratio SR is brought closer to the command value $SR_{ref}$. However, when the warm-up operation is shortened by setting the reference temperature T1 low, the control immediately after the start of the normal control may become unstable. Therefore, in the present embodiment, in the initial stage of the closed-loop control which is a period after the start of the closed-loop control in the normal operation and before the start of power generation by the generator 3, as described above, the calculation gain $G_2$ of the position control unit 43 and the internal gain $K_B$ of the position estimation unit 42 are adjusted in accordance with the oil temperature T and the valve opening degree (operation command value $I_{ref}$). Therefore, the control when the output rotation speed N2 approaches the command value $N2_{ref}$ in the initial stage of the closed-loop control is stabilized. When it is determined that the output rotation speed N2 has converged to the command value $N2_{ref}$ (t3), power generation by the generator 3 is started, and the frequency of the AC power generated by the generator 3 is maintained at the target frequency.

In FIG. 9, the values of the calculation gain $G_2$ and the gain $K_B$ are stabilized after the start of power generation. This is because the oil temperature T is not low, and in actuality, in the closed-loop control, the adjustment function of the calculation gain $G_2$ and the internal gain $K_B$ corresponding to the oil temperature T and the valve opening degree (operation command value $I_{ref}$) acts even after the start of power generation.

As described above, in the configuration in which the closed-loop control for calculating the operation command value $I_{ref}$ for the control valve 25 is executed so as to reduce the deviation ΔX between the target values $X_{ref}$ and the estimated values $X_{est}$ of the operation positions of the power rollers 16, the calculation gain $G_2$ and the internal gain $K_B$ of the position estimation unit 42 are adjusted in accordance with the oil temperature T and the valve opening degree (operation command value $I_{ref}$), so that the response delay due to the decrease in fluidity of oil at a low temperature is compensated by the gain adjustment. Therefore, it is possible to prevent the instability of the closed-loop control after switching from the warm-up operation to the normal operation while shortening the warm-up operation at the time of low-temperature startup. The time lag from the start of closed-loop control to the start of a power generation operation can also be stably reduced. Instead of directly adjusting the gain of the position control unit 43, for example, the gain of the position control unit 43 may be indirectly adjusted by adding a gain to the signal between the position subtraction unit 49 and the position control unit 43. In addition, instead of directly adjusting the gain of the position estimation unit 42, for example, the sensitivity of the internal model of the position estimation unit 42 may be indirectly adjusted by adding a gain to the signal between the position estimation unit 42 and the position subtraction unit 49.

Embodiment 2

Figure 11A:
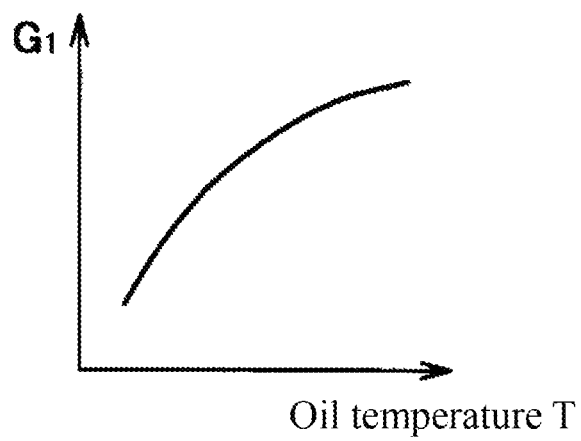
FIG. 11(A) is a graph showing the relationship between a calculation gain of a target position calculation unit shown in FIG. 10 and an oil temperature.
Figure 11B:
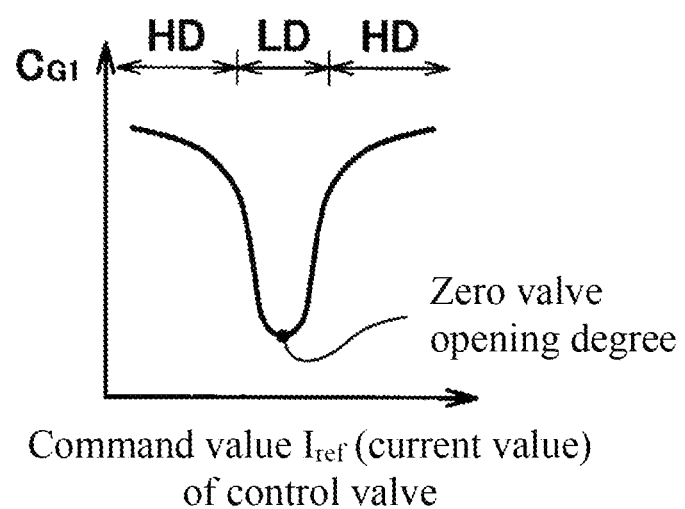
FIG. 11(B) is a graph showing the relationship between a correction coefficient of the calculation gain of the target position calculation unit and a command value (current value) of the control valve.

FIG. 10 is a block diagram of a transmission controller 140 according to Embodiment 2. FIG. 11(A) is a graph showing the relationship between a calculation gain of the target position calculation unit shown in FIG. 9 and an oil temperature. FIG. 11(B) is a graph showing the relationship between the calculation gain of the target position calculation unit and a command value (current value) of the control valve. Note that configurations that are the same as those in Embodiment 1 are denoted by the same reference numerals and description thereof is omitted. As shown in FIG. 10, in the transmission controller 140, the target position calculation unit 48 calculates the target value $X_{ref}$ based on the calculation gain $G_1$ determined by a gain setting unit 160 in accordance with the oil temperature T detected by the oil temperature sensor 35. Note that the calculation gain $G_2$ of the position control unit 43 is, for example, constant.

As shown in FIG. 11(A), in the gain setting unit 160, the calculation gain $G_1$ of the target position calculation unit 48 is set in advance so that the calculation gain $G_1$ decreases at a predetermined change rate as the oil temperature T decreases. The relationship between the calculation gain $G_1$ and the oil temperature T is inversely correlated with the relationship between the viscosity of the oil used in the hydraulic actuator 20 and the oil temperature T. In the present embodiment, the absolute value of the decrease rate of the calculation gain $G_1$ per unit temperature decrease is set to decrease as the oil temperature T decreases.

In this way, in the configuration in which the minor closed-loop control LP2 for calculating the operation command value $I_{ref}$ for the control valve 25 is executed so as to reduce the deviation $\Delta X$ between the roller position target values $X_{ref}$ and the estimated values $X_{est}$ together with the major closed-loop control LP1 for calculating the target values $X_{ref}$ of the roller positions so as to reduce the deviation $\Delta SR$ between the command value $SR_{ref}$ of the transmission ratio and the actual transmission ratio SR, the calculation gain $G_1$ of the target values $X_1$ decreases as the oil temperature T decreases, and therefore, the sensitivity $(\Delta X_{ref}/\Delta SR_{ref})$ of the major closed-loop control LP1 is adjusted to decrease as the oil temperature T decreases. Therefore, the responsiveness of the major closed-loop control LP1 decreases in accordance with a decrease in the responsiveness of the minor closed-loop control LP2 due to a decrease in fluidity of oil, and continuous vibration of the transmission ratio can be prevented.

As shown in FIG. 11(B), the calculation gain $G_1$ of the target position calculation unit 48 is multiplied by the correction coefficient $C_{G1}$ that changes in accordance with the operation command value $I_{ref}$ (drive current) of the control valve 25. The correction coefficient $C_{G1}$ is set so that the absolute value of the change rate of the calculation gain $G_1$ per unit temperature change decreases when the opening degree of the control valve 25 is in the low opening-degree region LD (second opening-degree region) smaller than the high opening-degree region as compared to that when the opening degree of the control valve 25 is in the high opening-degree region HD (first opening-degree region). That is, the calculation gain $G_1$ after correction takes a small value when the oil temperature T is low and the opening degree of the control valve 25 is small, and takes a large value when the oil temperature T is high and the opening degree of the control valve 25 is large. The relationship between the correction coefficient $C_{G1}$ and the operation command value $I_{ref}$ (drive current) is inversely correlated with the relationship between the absolute value of the change rate of the oil flow rate in FIG. 6 and the operation command value $I_{ref}$ (drive current).

In this way, even if the viscosity resistance of the flow path is relatively large in the region where the opening degree of the control valve 25 is small, the influence of viscosity is relieved by the decrease in the absolute value of the change rate of the calculation gain G1 in the region where the opening degree of the control valve 25 is small, and the nonlinearity between the valve opening degree and the oil flow rate is relieved. Instead of directly adjusting the gain of the target position calculation unit 48, for example, the gain of the target position calculation unit 48 is indirectly adjusted by adding a gain to the signal between the transmission ratio subtraction unit 47 and the target position calculation unit 48.

As described above, it is possible to prevent the instability of the closed-loop control after switching from the warm-up operation to the normal operation while shortening the warm-up operation at the time of low-temperature startup. As a result, the time lag from the start of closed-loop control to the start of a power generation operation can also be stably reduced. Since other configurations are the same as those of Embodiment 1 described above, description thereof is omitted.

The present invention is not limited to the above-described embodiments, and the configurations can be changed, added, or deleted. Some configurations or methods in one embodiment may be applied to another embodiment, and some configurations in the embodiment can be selectively extracted separately from other configurations in the embodiment. For example, the adjustment of the calculation gain $G_2$ by the gain setting unit 60, the adjustment of the calculation gain $G_1$ by the gain setting unit 160, and the adjustment of the internal gain $K_B$ by the gain setting unit 61 may be selectively combined, and, for example, only one or all of them may be implemented.

As the oil temperature acquisition unit, instead of the oil temperature sensor 35, a device that acquires information related to an oil temperature (for example, a temperature proportional to the oil temperature) (for example, a sensor that detects a piping temperature) may be used. As the position acquisition unit, instead of the position estimation unit 42, a sensor that detects the roller positions may be used. That is, as long as the position acquisition unit acquires the actual values of the roller positions, the position acquisition unit may estimate the actual values of the rollers, or may receive a sensor value detected by a roller position sensor. The control target of the hydraulic actuator 20 may be a continuously variable transmission of another form instead of the toroidal continuously variable transmission, or may be a device that requires position control other than the transmission. The continuously variable transmission may drive another one without driving the generator.

REFERENCE SIGNS LIST 1 integrated drive generator (IDG)
3 generator
10 toroidal continuously variable transmission
16 power roller (transmission element)
20 hydraulic actuator
25 control valve
28 spool
35 oil temperature sensor (oil temperature acquisition unit)
40, 140 transmission controller (position controller)
42 position estimation unit (position acquisition unit)

43 position control unit
44 actual transmission ratio calculation unit (actual transmission ratio acquisition unit)
48 target position calculation unit
$G_1$, $G_2$ calculation gain (first gain)
$K_B$ internal gain (second gain)
T oil temperature
HD high opening-degree region (first opening-degree region)
LD low opening-degree region (second opening-degree region)
$I_{ref}$ operation command value
$X_{ref}$ target value
LP1 major closed-loop control
LP2 minor closed-loop control

The invention claimed is:

1. A position controller that performs position control by outputting a drive signal to a control valve of a hydraulic actuator that changes an operation position of an object, the position controller comprising:
an oil temperature acquisition unit that acquires information on an oil temperature of the hydraulic actuator;
a position acquisition unit that estimates an actual value of an operation position of the object;
a position control unit that calculates an operation command value for the control valve by closed-loop control so as to reduce a deviation between a target value of the operation position of the object and the actual value;
a gain setting unit that changes at least one gain of the closed-loop control so that sensitivity of the closed-loop control increases as the oil temperature decreases; and
a position subtraction unit that obtains the deviation,
wherein the at least one gain includes a first gain used to obtain the operation command value from the deviation,
wherein the gain setting unit increases the first gain as the oil temperature decreases,
wherein the first gain is a calculation gain of the position control unit,
wherein the at least one gain includes a second gain used to obtain the actual value input to the position subtraction unit, and
wherein the gain setting unit decreases the second gain as the oil temperature decreases.

2. The position controller according to claim 1,
wherein the position acquisition unit is a position estimation unit that estimates the actual value of the operation position of the object, and
wherein the second gain includes sensitivity of an internal model of the position estimation unit.

3. The position controller according to claim 1, wherein the object is a transmission element that changes a transmission ratio of a continuously variable transmission in accordance with a position change thereof.

4. The position controller according to claim 3, wherein the continuously variable transmission is a toroidal continuously variable transmission that changes the transmission ratio in accordance with a tilt angle of a power roller, and the transmission element is the power roller.

5. The position controller according to claim 4,
wherein power output from the continuously variable transmission is input to a generator, and the generator starts a power generation operation with a delay from start of the closed-loop control, and
wherein the gain adjustment is performed at least in a period after the closed-loop control is started and before the power generation operation of the generator is started.

6. The position controller according to claim 1, wherein the gain setting unit performs correction so that an absolute value of a change rate of the gain with respect to a change in the oil temperature increases when an opening degree of the control valve is in a second opening-degree region smaller than a first opening-degree region as compared to that when the opening degree of the control valve is in the first opening-degree region.

7. A position controller that performs position control by outputting a drive signal to a control valve of a hydraulic actuator that changes an operating position of a transmission element so as to change a transmission ratio of a continuously variable transmission, the position controller comprising:
an oil temperature acquisition unit that acquires information of an oil temperature of the hydraulic actuator;
an actual transmission ratio acquisition unit that acquires an actual value of the transmission ratio;
a position acquisition unit that estimates an actual value of an operation position of the transmission element;
a target position calculation unit that calculate a target value of the operating position of the transmission element by first closed-loop control so as to reduce a deviation between a command value of the transmission ratio and the actual value of the transmission ratio;
a position control unit that calculates an operation command value for the control valve by second closed-loop control so as to reduce a deviation between the target value of the operation position of the transmission element and the actual value of the operation position of the transmission element; and
a gain setting unit that changes a gain of the first closed-loop control so that sensitivity of the first closed-loop control decreases as the oil temperature decreases.

8. The position controller according to claim 7, wherein the continuously variable transmission is a toroidal continuously variable transmission that changes the transmission ratio in accordance with a tilt angle of a power roller, and the transmission element is the power roller.

9. The position controller according to claim 8,
wherein power output from the continuously variable transmission is input to a generator, and the generator starts a power generation operation with a delay from start of the second closed-loop control, and
wherein the gain adjustment is performed at least in a period after the second closed-loop control is started and before the power generation operation of the generator is started.

10. The position controller according to claim 7, wherein the gain setting unit performs correction so that an absolute value of a change rate of the gain with respect to a change in the oil temperature decreases when an opening degree of the control valve is in a second opening-degree region smaller than a first opening-degree region as compared to that when the opening degree of the control valve is in the first opening-degree region.

* * * * *